March 9, 1971     J. A. MULLINS ETAL     3,568,446
DUCTED FAN GAS TURBINE ENGINE
Filed June 17, 1969     2 Sheets-Sheet 1

INVENTORS
JOHN ALBERT MULLINS
BY PETER ARTHUR WARD
ATTORNEYS

March 9, 1971 J. A. MULLINS ETAL 3,568,446
DUCTED FAN GAS TURBINE ENGINE
Filed June 17, 1969 2 Sheets-Sheet 2

INVENTORS
JOHN ALBERT MULLINS
BY PETER ARTHUR WARD
ATTORNEYS

United States Patent Office 3,568,446
Patented Mar. 9, 1971

3,568,446
DUCTED FAN GAS TURBINE ENGINE
John Albert Mullins and Peter Arthur Ward, Derby, England, assignors to Rolls-Royce Limited, Derby, England
Filed June 17, 1969, Ser. No. 833,938
Claims priority, application Great Britain, June 26, 1968, 30,530/68
Int. Cl. F02k 1/20
U.S. Cl. 60—226                                            5 Claims

ABSTRACT OF THE DISCLOSURE

A ducted fan gas turbine engine having a jet pipe, within which a thrust reverser is mounted, the jet pipe having at least one movable portion which is movable between a closed position, in which it closes an opening in the jet pipe, and an open position in which it opens the said opening to a flow of the jet gases from the said thrust reverser, the movable portion, when in the open position, extending into the flow path of the fan air so as to cause reversal of the latter.

---

This invention concerns a ducted fan gas turbine engine.

According to the present invention, there is provided a ducted fan gas turbine engine having a jet pipe, a pod within which the jet pipe is mounted and whose downstream end is disposed upstream of the downstream end of the jet pipe, the pod defining with the jet pipe a substantially annular duct for flow of and discharge of a substantially annular stream of fan air, a thrust reverser mounted within the jet pipe, the portion of the jet pipe downstream of the pod having at least one movable portion which extends short of the lowermost portion of the jet pipe and which is movable between a closed position, in which it closes an opening in the jet pipe, and an open position in which it opens the said opening to a flow of jet gases from the said thrust reverser, the movable portion, when in the open position, extending into the flow path of the annular stream of fan air so as to cause reversal of a portion only of the latter, the unreversed portion of flow of the annular stream of fan air being beneath the lowermost portion of the jet pipe extending from the pod and, thus, providing a barrier to reduce the ingestion of stones and dirt into the engine.

As will be appreciated, the invention provides that the reversal or spoiling of both the jet gases and the fan air is effected by means of a simple construction employing a minimum of parts. Thus a reduction in the number of parts is effected by employing the said movable portion or portions both as a means of closing an opening or openings in the jet pipe and also as a means of effecting reversal or spoiling of the fan air.

Preferably there are a plurality of movable portions each of which is hinged to the jet pipe at its downstream edge.

Each said movable portion may also be hinged to a pylon from which the engine is supported.

Preferably the upstream edge of the or each movable portion, when in the open position, is aligned with the fan duct.

The or each movable portion, when in the closed position, preferably merges smoothly into the remaining portion of the jet pipe.

The invention also comprises an aircraft provided with such an engine, the said pylon extending from a wing of the aircraft.

Figure 1:
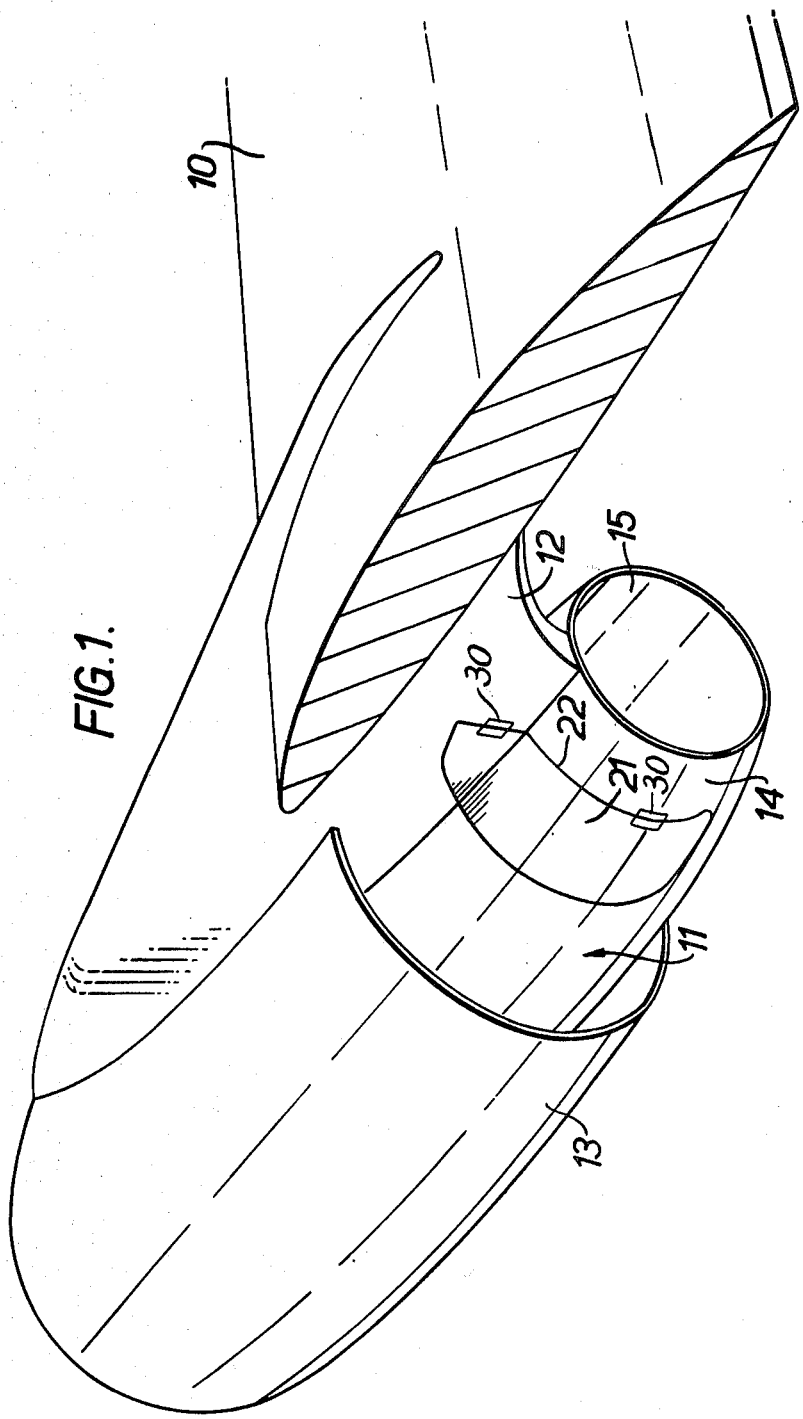
Figure 2:
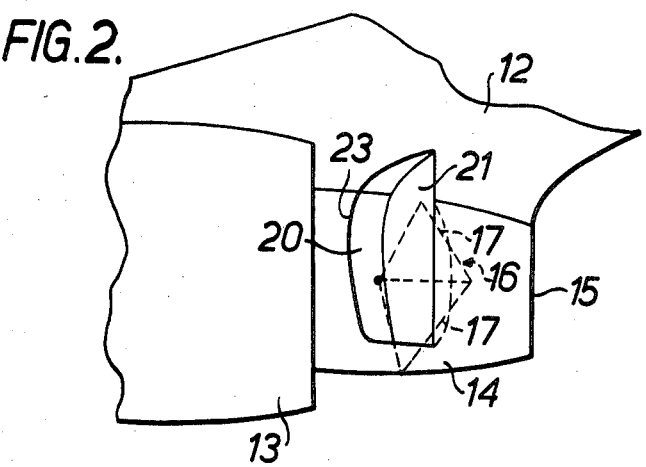
Figure 3:
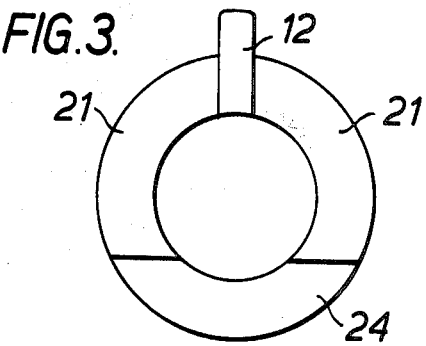
Figure 4:
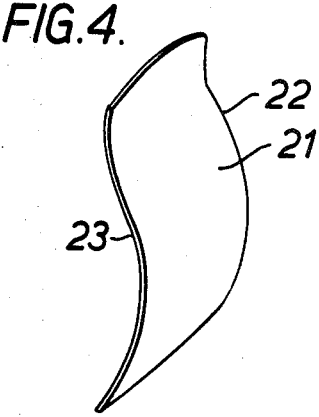

The invention is illustrated, merely by way of example, in the accompanying drawings, in which:

FIG. 1 is a broken-away view of part of an aircraft provided with a ducted fan gas turbine engine in accordance with the present invention, FIG. 2 is an elevation of part of the engine shown in FIG. 1, FIG. 3 is a diagrammatic end view of the structure shown in FIG. 2, and FIG. 4 is a perspective view of a reverser door which forms part of the structure of the said engine.

In FIG. 1 there is shown an aircraft having a wing 10 beneath which a ducted fan gas turbine engine 11 is supported by means of a pylon 12. The engine 11 drives a fan (not shown) which is mounted within a pod 13. The pod 13 is also supported by the pylon 12.

The engine 11 has a jet pipe 14 which is mounted within the pod 13 and at whose downstream end there is a jet nozzle 15 through which the jet gases are rearwardly directed during forward flight. The downstream end of the pod 13 is disposed substantially upstream of the downstream end of the jet pipe 14, the pod 13 defining with the jet pipe 14 a substantially annular duct for flow of and discharge of a substantially annular stream of fan air. Mounted within the jet pipe 14 is a thrust reverser (or spoiler) 16 (FIG. 2). The latter may, as shown, be constituted by two clam shell doors 17 which are movable between an open position, in which they permit the jet gases to pass out through the nozzle 15, and a closed position, in which they occlude flow through the jet pipe 14 and cause the jet gases to pass out through openings 20 in the jet pipe.

The jet pipe 14 is provided with two such openings 20 each of which may be closed and opened by a movable reverser door 21, the doors 21 being disposed downstream of the pod 13. Each of the reverser doors 21 has a downstream edge 22 at which it is hinged both to the jet pipe 14 and to the pylon 12 as indicated diagrammatically at 30.

Each of the reverser doors 21 is movable (by means not shown) between the closed position shown in FIG. 1, and the open position shown in FIG. 2. In the closed position, each reverser door 21 closes the opening 20 in the jet pipe 14 and merges smoothly into the remaining portion of the jet pipe. In the open position, each of the reverser doors 21 opens the respective opening 20 to a flow of the jet gases which have been re-directed by the thrust reverser 17 and, at the same time, extends into the flow path of the fan air so as to cause reversal (or spoiling) of the latter.

When the reverser doors 21 are in the open position shown in FIG. 2, the upstream edge 23 of each of the doors 21 is aligned with the pod 13. However, as is clearly shown in FIG. 3, each of the doors 21 when in the open position does not extend to the lowermost portion of the jet pipe 14, with the result that there is a region 24 of the flow of the annular stream of fan air which will not be reversed by the reverser doors 21. This unreversed portion of the substantially annular stream of fan air is provided to reduce the risk of the ingestion of stones or dirt into the engine following thrust reversal.

Means (not shown) are provided for interconnecting the reverser doors 21 and clam shell doors 17 so that the doors 21 are opened when the doors 17 are closed and vice versa.

As will be appreciated, a very simple mechanism is thus provided for effecting reversal both of the jet gases and of the fan air.

We claim:
1. A ducted fan gas turbine engine comprising: a pod for a fan; a jet pipe having an upstream portion mounted within said pod and a downstream portion extending from said pod and having its downstream end disposed substantially downstream of said pod's downstream end, said pod defining with the upstream portion of said jet pipe a substantially annular duct for flow of and discharge of a substantially annular stream of fan air surrounding the downstream portion of said jet pipe, said downstream portion of said jet pipe having at least one opening therein which extends short of the lowermost portion of the jet pipe; a thrust reverser mounted within said jet pipe and operable to cause jet gases to flow through said opening; and a door on the downstream portion of said jet pipe, said door being movable from a first position closing said opening to a second position uncovering said opening to permit flow therethrough of jet gases from said jet pipe when said thrust reverser is operable to cause such flow, said door extending into the flow of the substantially annular stream of fan air when in said second position to cause reversal of a portion of the annular stream of fan air with another portion of the annular stream of fan air remaining unreversed and flowing adjacent the lowermost portion of the downstream portion of the jet pipe to thereby provide a barrier for ingestion of stones and dirt into the engine.

2. A ducted fan gas turbine engine as claimed in claim 1 in which there are a plurality of said openings and in which there are a plurality of said doors, there being one door for each opening, the one door being hinged to the jet pipe near its downstream edge.

3. A ducted fan gas turbine engine as claimed in claim 2 including a pylon for supporting the engine, and in which each door is also hinged to said pylon.

4. A ducted fan gas turbine engine as claimed in claim 2 in which the upstream edge of each movable door, when in the second position, is aligned with the fan duct.

5. A ducted fan gas turbine as claimed in claim 1 in which the movable door, when in the first position, merges smoothly into the downstream portion of the jet pipe.

References Cited
UNITED STATES PATENTS

| | | | |
|---|---|---|---|
| 3,068,646 | 12/1962 | Fletcher | 60—226 |
| 3,269,663 | 8/1966 | Strobl | 60—226 |
| 3,492,821 | 2/1970 | Monaghan | 60—262 |

DOUGLAS HART, Primary Examiner

U.S. Cl. X.R.

60—230